United States Patent [19]

Schink

[11] 4,439,087
[45] Mar. 27, 1984

[54] STOCK RACK AND LOADING CHUTE FOR TRUCKS

[76] Inventor: Dave K. Schink, Rte. 3, Box 676, Union, Mo. 63084

[21] Appl. No.: 236,334

[22] Filed: Feb. 20, 1981

[51] Int. Cl.³ .............................. B60P 1/00; B60P 1/64
[52] U.S. Cl. ..................................... 414/537; 49/177; 296/3; 296/51
[58] Field of Search ...................... 414/537; 296/3, 12, 296/51, 52, 50, 61, 167, 164; 49/168, 176, 177

[56] References Cited

U.S. PATENT DOCUMENTS

| | | | |
|---|---|---|---|
| 1,487,106 | 3/1924 | Kelly | 49/177 |
| 2,779,489 | 1/1957 | Boom | 414/537 |
| 2,822,940 | 2/1958 | Kopaska | 296/61 X |
| 3,148,912 | 9/1964 | Curtis et al. | 296/3 X |
| 3,155,203 | 11/1964 | Kappen | 296/51 X |
| 3,442,550 | 5/1969 | Esbeck | 296/50 |
| 3,456,977 | 7/1969 | Dugan | 296/51 |
| 3,466,082 | 9/1969 | Branch | 296/164 |
| 3,475,046 | 10/1969 | Webster | 296/3 |
| 3,600,032 | 8/1971 | Gross | 296/50 X |
| 3,763,827 | 10/1973 | Burkart | 296/61 X |
| 3,977,545 | 8/1976 | Lloyd | 414/537 |
| 4,199,186 | 4/1980 | Faverino | 296/50 X |

Primary Examiner—Bruce H. Stoner, Jr.
Attorney, Agent, or Firm—Glenn K. Robbins

[57] ABSTRACT

A collapsible stock loading chute for vehicles. The chute is particularly designed for floor supported stock racks for pick-up trucks and is adapted to be slid underneath a false bed supported by a frame which receives a ramp of the chute. When withdrawn from underneath the false bed the chute ramp may be pivoted to the frame at a forward end and supported on the ground and connected to chute walls hooked to the rack to load stock. The ramp may be employed without the walls for loading haltered animals or for loading equipment or other paraphernalia. The rear wall of the stock rack is provided with a vertically slidably gate frame having a pair of hinged gate members in order that the gate may be raised to open the gate or alternatively to swing inwardly or outwardly the hinged gate members for different loading conditions.

11 Claims, 14 Drawing Figures

STOCK RACK AND LOADING CHUTE FOR TRUCKS

BACKGROUND OF THE INVENTION

In the past, loading of stock in pick-up trucks has required the use of separate, wheeled, loading chutes which have been kept at the point of loading or trailered to the point of use. This has necessitated inconvenience and expense through the separate wheeled chute trailer and has hampered loading efficiency through the obvious difficulty in hook up and trailer.

While self-contained truck chutes have been designed, these have been integrally designed to fit under a permanent bed of large stock type trucks rather than pick-ups and are permanent parts of the truck structure.

There has long been a need for providing a ready means for loading stock in pick-up trucks which are more widely used in general farming and ranching use than any other type of truck. Desirably such loading means has been sought by a readily available loading chute which can be assembled as needed and employed in rough terrain wherever the stock to be loaded are to be found.

Such need of easily assembled chutes has existed for use with stock racks of the floor supported type as well as those fitted on the side walls of the truck bed. For general loading use such stock racks have also encountered a problem in loading or unloading of stock from docks having different structures. While such stock racks conventionally have been provided with tail gates that may be raised vertically to open the gate this does not fit all loading conditions. Some loading conditions make such raising of a gate difficult or undesirable and there has been a need to open the gate by swinging inwardly or outwardly and the gates provided in the past have not provided such adaptable opening and loading provisions.

SUMMARY OF THE INVENTION

By means of the instant invention there has been provided a collapsible stock loading chute which can be simply installed in pick-up trucks as well as other types of vehicles including stock trucks, trailers and the like. The chute while designed for use under a specially designed false floor placed on the pick-up bed with a truck bed supported stock rack is of generally utility and may be employed with racks fitting on the side walls of the pick-up or other types of stock confining enclosures used on the truck.

The false floor is comprised of a frame which supports a floor or bed which is raised and supports the stock within the truck. The chute is comprised of a ramp or bed which is nested within the frame on tracks and can be withdrawn by sliding it out and pivoted at a forward end upon the frame with a rear end being supported on the ground. Side walls of the chute which may be hooked when not in use upon the sides of the stock rack are then connected at the sides of the chute to present the assembled chute for the desired stock loading operation.

While the loading has been particularly described for employment in pick-up trucks, stock trucks and trailers for use with the chute walls, the ramp may be employed without the chute walls for loading haltered animals upon the ramp. Similarly the ramp may be employed for loading equipment such as tractors of one type or other paraphernalia as desired.

In order to enable the stock rack to be employed for general use in different loading situations the rear wall of the gate is provided with a gate to open and close an opening for stock loading and unloading. The gate is specially designed of a pair of gate sections hinged to a frame received within a track means. The gate frame and sections may be raised as a unit to open the gate. Alternately with the frame kept stationary, the individual gate sections may be opened inwardly or outwardly to enable opening and closing of the gate to accomodate a wide variety of loading conditions. The gate structure because of its adaptability for general use may be employed in other structures besides pick-up trucks typified by stock trucks, trailers and the like.

The above features are objects of this invention. Further objects of this invention will appear in the detailed description which follows and will be otherwise apparent to those skilled in the art.

For the purpose of illustration of this invention a preferred embodiment thereof is shown in the accompanying drawing. It is to be understood that this is for the purpose of example only and that the invention is not limited thereto.

IN THE DRAWINGS

Figure 14:
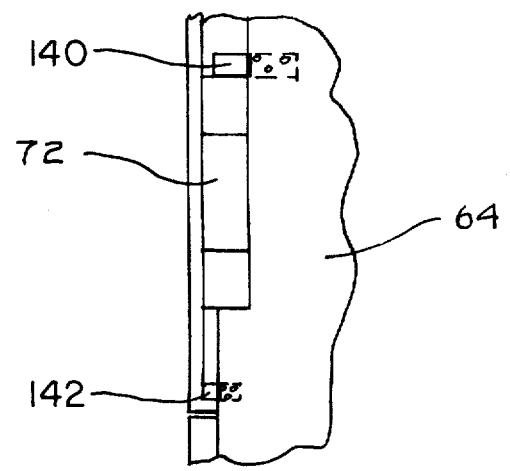
Figure 9:
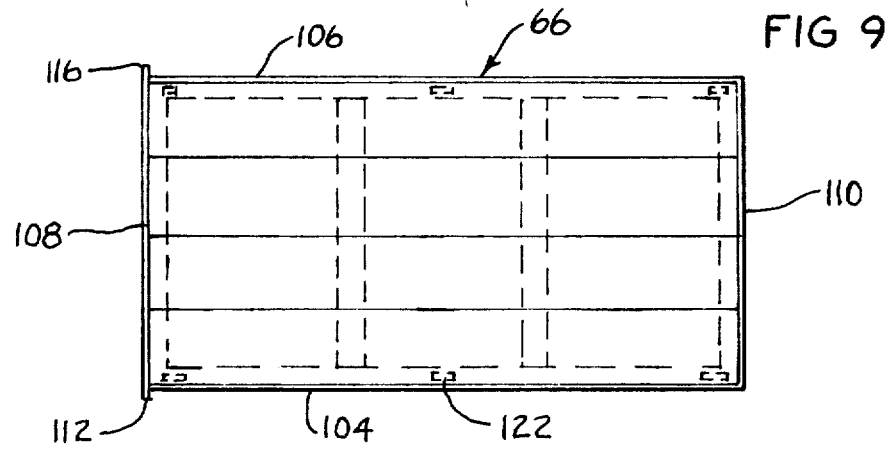
Figure 10:
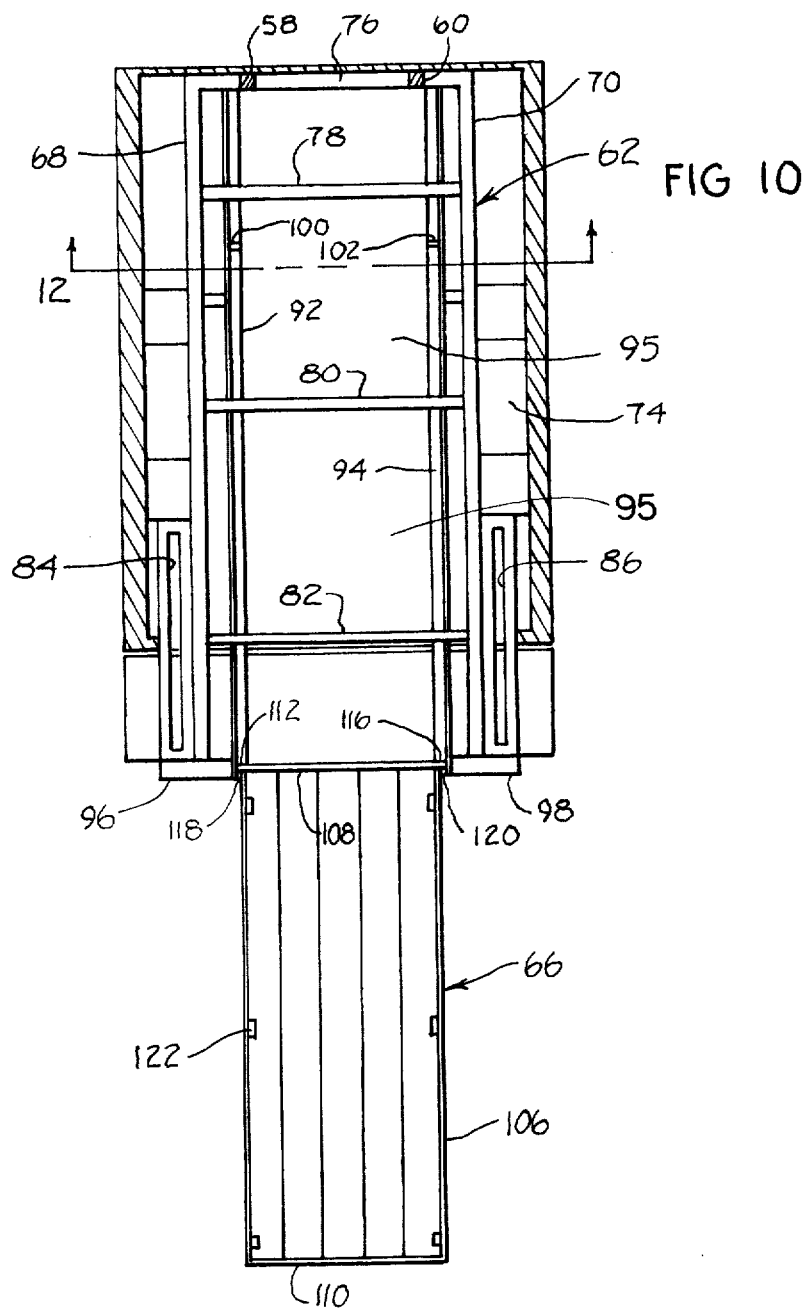
Figure 11:
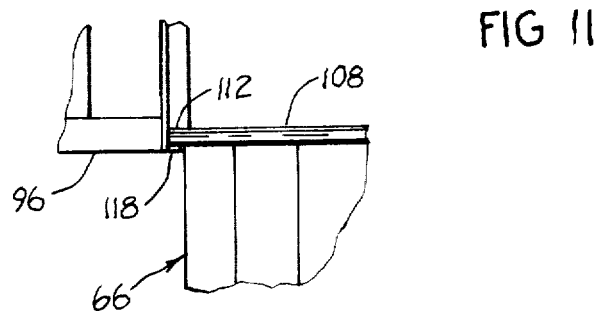
Figure 12:
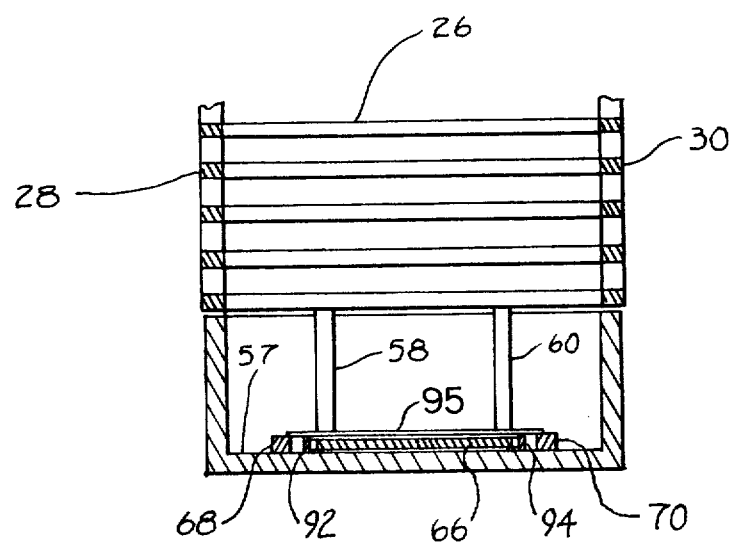
Figure 13:
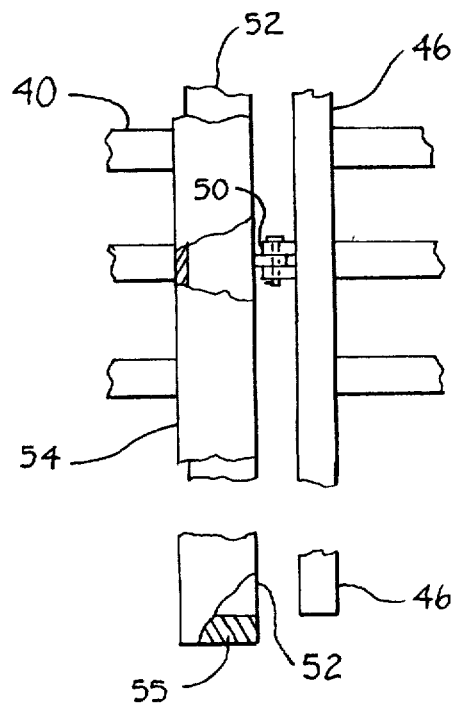

FIG. 9 ia a top plan view of the chute ramp;

FIG. 10 is a top plan view of the frame of the rack bed and the withdrawn chute ramp;

FIG. 11 is an enlarged fragmentary plan view taken from FIG. 10 showing the bearing relationship of the stub shafts in the bed frame when the chute ramp is withdrawn;

FIG. 12 is a view in section taken on the line 12—12 of FIG. 10 with the ramp stored;

FIG. 13 is an enlarged fragmentary view in elevation and partly broken away to show the gate frame and track and hinge structure; and FIG. 14 is a fragmentary plan view of the false floor and truck floor showing the structure of flip blocks to prevent shifting and sliding off the truck.

DESCRIPTION OF THE INVENTION

Figure 2:
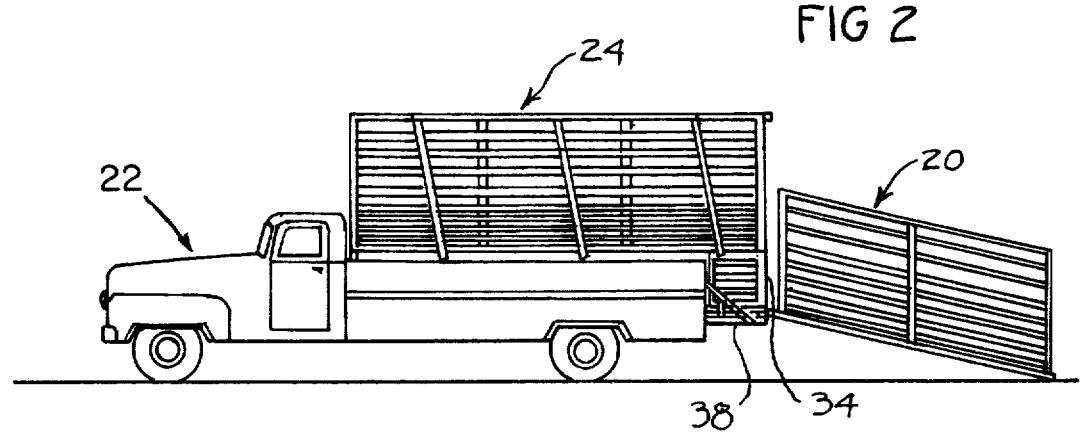
FIG. 2 is a view in side elevation of a pick-up truck supporting the rack with the chute withdrawn.

The cattle chute of this invention is shown in withdrawn and loading position in FIG. 2 where it is generally indicated by the reference numeral 20. The truck and stock rack with which it is employed are shown by the reference numerals 22, and 24 respectively.

The stock rack is comprised of a front wall 26, left side wall 28, right side wall 30 and rear wall 32 which are connected at their corners to provide a rigid structure. The side walls 28 and 30 have downwardly depending portions 34 which are supported above a tailgate 38 of the truck.

The rear wall 32 is comprised of a left hand portion 40 and right hand portion 42 which bound a central gate 44 adapted to be raised vertically or swung inwardly or outwardly through divided gate sections 46 and 48 hinged by hinges 50 to a slidable gate frame 52 as best shown in FIGS. 3 through 7 and 13. The gate sections are locked together by a latch 53. In order to provide a track for the slidable gate frame U-shaped track members 54 and 56 are formed at the inside of the left hand and right hand sections of the rear wall of the stock rack. As best shown in FIG. 13, a stop or plug 55 at the bottom of the track member stops the gate frame in spaced relation above the floor of the truck to provide a clearance space for the chute ramp as will further appear.

The rack is supported upon the bed 57 of the pick-up by the rear wall which is supported upon a support frame 62 which rests on the floor of the pick-up as best shown in FIGS. 10 and 12 and extends over and rests on the tailgate and by vertical support members 58 and 60 which depend from the front wall of the rack and are connected to the front of the support frame 62. The support frame serves the multiple purpose of supporting the walls of the rack while also serving to support the false floor or bed 64 and serving as a sealed storage compartment for the floor or ramp 66 of the chute as will more fully appear hereinbelow.

The support frame is comprised of longitudinal stringers 68 and 70 which fit closely within wheel wells 72 and 74 of the truck and are connected at the front to a cross brace 76 abuttable against a front wall of the pick-up bed. Additional cross braces 78, 80 and 82 are employed to provide a firm load bearing support for the false floor or bed 64. The floor 64 may be of thick plywood or other standard material of construction of sufficient strength and rigidity to support the stock which may be cattle, horses, sheep, hogs, goats or other livestock.

Lateral box-like frame extensions 84 and 86 are welded to the steel frame to fill in the space behind the wheel wells and provide stability against shifting of the frame due to livestock and support the offset portions 88 and 90 of the floor 64.

Supported underneath the lateral braces 76, 78, 80 and 82 and connected thereto by welding or the like are angle irons 92 and 94 that function as a track for the chute ramp 62 and define a sealed storage compartment 95 for the ramp underneath the false floor 64. The sealed compartment protects the stored ramp from freeze-up under snow and ice conditions, manure clogging and the like. The rear ends of the angle irons are connected to the lateral extensions 84 and 86 by braces 96 and 98. Stop means 100 and 102 are provided at a forward portion of the track angle irons to limit the forward movement of the ramp and to ensure ready accessibility thereof.

The ramp 66 as best shown in FIGS. 10, 11 and 12 is comprised of longitudinal angle iron stringers 104 and 106 and a front brace 108 and rear brace 110 which support the floor 66. The floor may be constructed of wood, plywood or other rigid load bearing material sufficient to withstand the weight of the livestock as they are being loaded.

The front brace is provided with oppositely extending short stub shafts 112 and 116 which may be formed as cylindrical or rod like extensions of the brace 108. These shafts fit within and ride upon the angle iron tracks which serve as a guide for the ramp as it is slid in or out of the false floor compartment 95. Vertical stops 118 and 120 restrain the stub shafts from moving rearwardly out of the track and with the track act as a journal for the stub shafts which may be pivoted therein as the ramp is raised or lowered from a ground supporting position.

Figure 1:
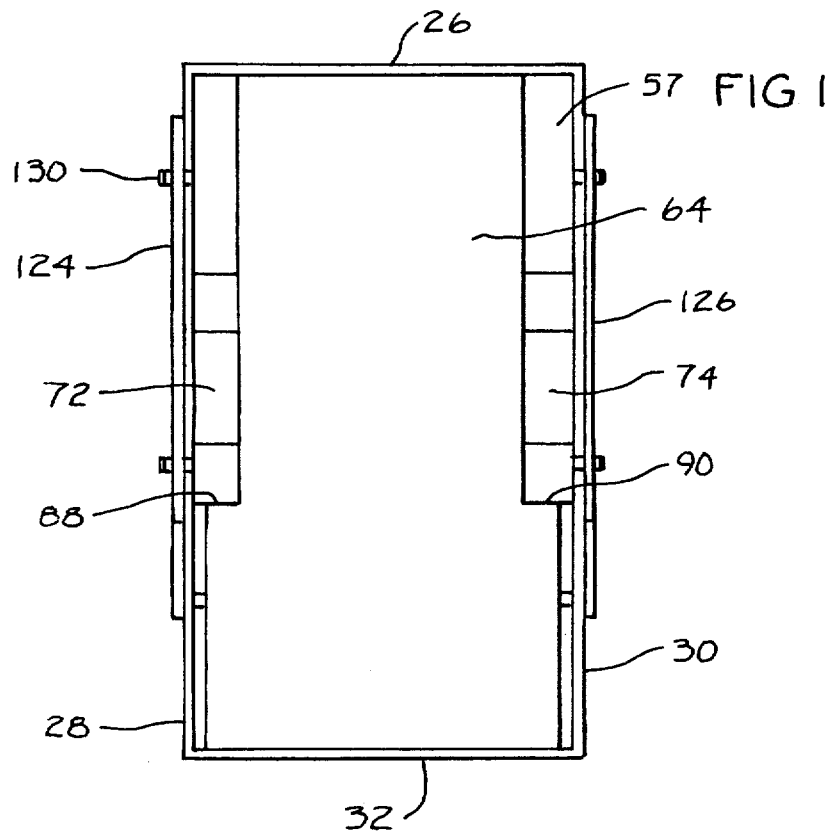
FIG. 1 is a top plan view of the rack supported on the bed of a pick-up truck.
Figure 3:
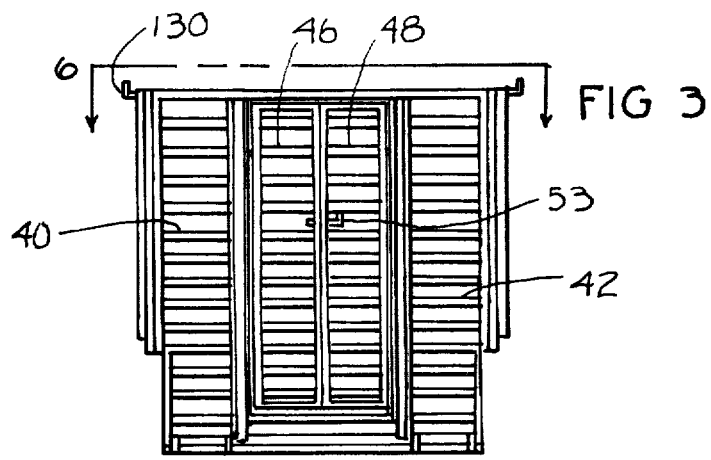
FIG. 3 is a view in rear elevation of the rack showing the rear gate of the rack closed.
Figure 4:
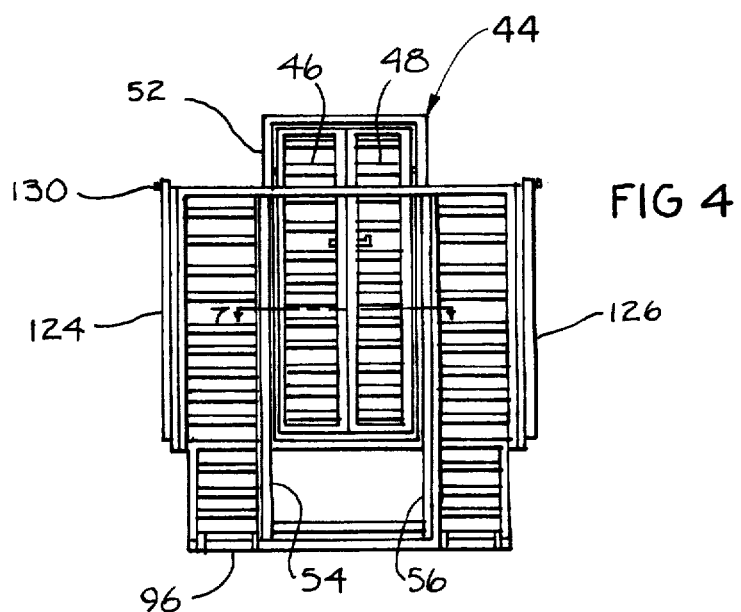
FIG. 4 is a view similar to FIG. 3 showing the gate partially elevated.
Figure 5:
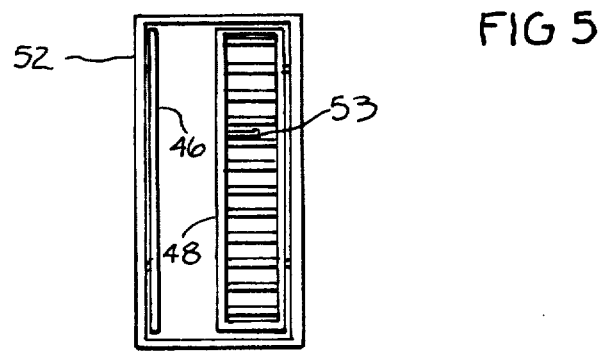
FIG. 5 is a view in rear elevation of the gate frame showing one section of the gate opened inwardly and the other section closed.
Figure 6:
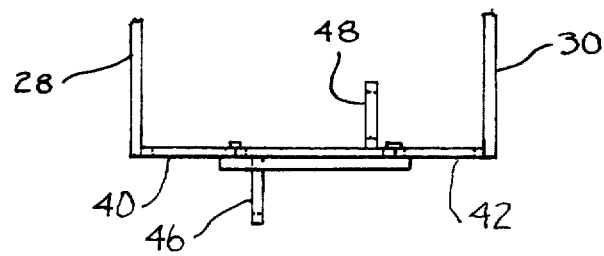
FIG. 6 is a fragmentary top plan view of the rack taken on the line 6—6 of FIG. 3 showing the left section of the gate opened outwardly and the right section opened inwardly.
Figure 7:
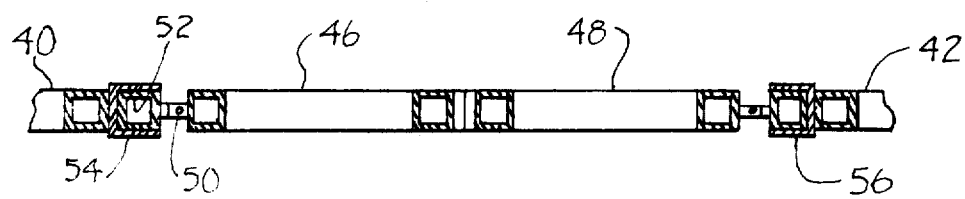
FIG. 7 is an enlarged view in section taken on the line 7—7 of FIG. 4.

The ramp 66 as best shown in FIGS. 9 and 10 is provided with side openings 122 which serve as sockets to receive stakes from the chute side walls 124 and 126. Each of the side walls is provided with a plurality of downwardly depending stakes 128 which are receivable within the sockets to support the walls in stock guiding relation as shown in FIG. 2. The chute walls when not in use are stored on hooks 130 connected to the side walls of the stock rack as shown in FIGS. 1 and 3.

Figure 8:
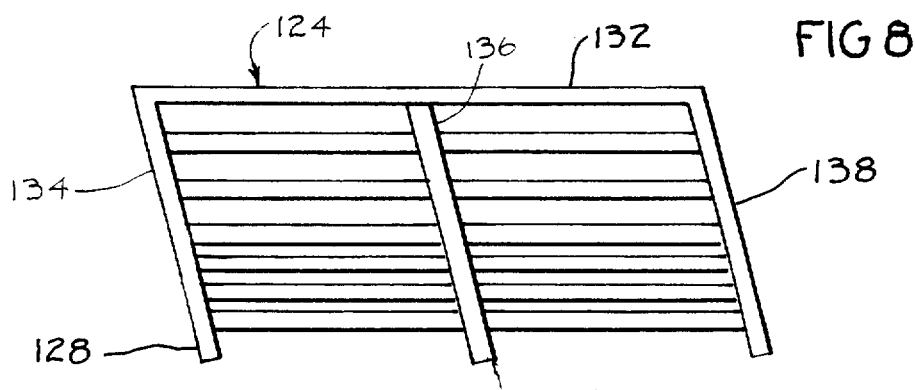
FIG. 8 is a view in side elevation of a chute wall.

The chute walls 124 and 126 as shown in FIG. 8 are comprised of longitudinal stringers 132 which are connected at a slant angle to front, middle and rear cross members 134, 136 and 138 which have depending lower portions forming the stakes 128. As shown in FIG. 2 the front of the chute side walls defined by the cross member 134 is substantially vertical and parallel to the rear rack wall when the chute is supported upon level ground. The front of the chute may be about one-half foot to one foot from the rear rack wall in this positional relationship to provide adaptability for supporting the rear of the chute in rough terrain where the ground support for the rear end of the chute may be uneven and somewhat higher than the trunk. In this condition the rear end of the chute may be rotated about the stub shaft in a counter clockwise position as viewed in FIG. 2 which is permitted by the slight degree of spacing of the front of the chute from the rear rack wall.

In order to provide stability for the rack when installed in the bed of the pick-up truck hinged flip blocks 140 and 142 may be employed as shown in FIG. 14. The flip blocks may be moved between the positions shown in full lines and dotted lines. The flip block 140 is employed in front of the wheel well to prevent rearward shifting of the rack and floor unit. Similarly the flip block 142 may be pivoted to abut against a rear corner wall of the truck for trucks so provided. Either one or both of these blocks may be employed as desired.

USE

The stock rack and loading chute of this invention may be easily installed as a prefabricated unit in standard pick-up trucks. The installation is simply accomplished by lowering the tailgate 38 of the truck and simply sliding the self contained rack and connected support frame 62 with the stored ramp from the rear of the truck bed to the installed position shown in FIGS. 1 and 2. Alternatively the unit may be lowered into the installed position from a superimposed vertical position by appropriate lowering and raising means. The side walls 124 and 126 of the chute are then supported on the hooks 130.

Once installed, the pick-up may be used in conventional fashion and is not encumbered with a trailered chute which greatly increases its mobility. Stock are supported on the false floor 64 which provides a strong support for stock of any type to be loaded. The rear gate 44 of the rack may be used in various fashions for loading from different types of docks or the like. Thus the gate may be raised and lowered in the fashion shown in FIG. 4 or the individual gate sections may be unlatched from the latch 53 and opened inwardly or outwardly as the occasion requires.

While the stock rack has been shown of a length to extend over the rear of the truck and be supported on the tailgate it will be understood that it may be shorter and terminate coextensively with the rear of the truck with the tailgate raised in the closed position. In such types of racks the truck may be backed with the tailgate lowered to a position flush against a loading dock. The gate sections which are of a width approximately the width of the tailgate may then be opened outwardly to close the space between the rear of the rack and the dock while the stock are being loaded or unloaded. Thus, it will be seen that the adaptability of the rear gate for opening in the various manners provided by the structure of the instant invention serves for a multitude of different loading conditions which greatly facilitates the task of the stockman.

When the chute is desired to be employed the user simply grasps the rear end of the ramp 66 and, withdraws it to the fully extended position shown in FIGS. 2 and 10 and permits the ramp to be lowered by its own weight to support the rear end upon the ground. When this had been accomplished, the side walls 124 and 126 of the chute are unhooked from the stock rack and are supported upon the ramp by interfitting the stakes 128 in the sockets 122. The chute is then ready for use. The storage of the chute ramp and side walls is accomplished in a reverse manner to that above described. In the storage of the ramp the stops 100 and 102 serve to stop the ramp in a position in the storage area where the rear end can be readily grasped for use in the next operation. In the stored position the compartment 95 receives the ramp in a substantially sealed protected relation defined by the false floor on the top and the track members at the side. This structure provides protection against freeze-up or clogging by ice or debris such as hay, manure or the like.

While the use of the loading device comprising the storable ramp, the supporting frame and false floor have been particularly described for use in pick-up trucks, the invention may be employed in other vehicles as will be readily apparent. Thus, the loading device may be employed in other types of vehicles such as stock trucks, trailers and the like. The ramp may also be employed without the chute side walls for loading haltered or appropriately tethered stock and equipment of one type or another such as tractors, equipment with wheels or other paraphernalia.

Various changes and modifications may be made within this invention as will be apparent to those skilled in the art. Such changes and modifications are within the scope and teaching of this invention as defined by the claims appended hereto.

What is claimed is:

1. A stock rack for pick-up trucks and the like, said rack comprising a front rack wall member, a pair of side rack walls and a rear rack wall, said rear rack wall having a left hand and right hand section spaced from one another to define a central opening receiving a gate means, said means being comprised of a pair of laterally positioned gate members, pivot means supporting each of said gate members for swinging movement inwardly and outwardly of said truck and means for raising and lowering said gate members in the closed position, each of said gate members being hinged to a frame member slidably receivable in a vertical track member connected to each of said left hand and right hand rear wall sections, said frame member completely framing the hinged gate members and being vertically moveable with the gate members as a unit.

2. The stock rack of claim 1 in which a lock means is provided to hold said gate members in a locked position when closed together.

3. The stock rack of claim 1 in which said rack is provided with a raised planiform bed supported by support frame means upon and substantially overlying a flat bed of said truck, said support frame means being connected to the front and rear rack walls and including a pair of longitudinally extending guide members defining with said truck flat bed and said separate raised bed a storage compartment for a ramp of a stock loading chute, said loading chute ramp being slidably receivable within said compartment and having pivot means when retracted from said compartment for pivoting a forward end to said support frame means, said chute ramp having a rear end adapted to be lowered when the chute ramp is retracted by pivoting said ramp about said pivot means, and side stock restraining members removably receivable by said chute ramp in the retracted position.

4. The stock rack of claim 3 in which said stock restraining members are comprised of a rigid stock restraining wall having a plurality of downwardly extending stake elements removably receivable in socket means provided at the sides of said ramp.

5. The stock rack of claim 4 in which said stock restraining members are in the form of a grid-like wall and have a forward edge generally perpendicular when the rear end of the ramp is lowered, said forward edge being spaced from the rear wall of said rack to provide for lowering the ramp upon uneven ground which may vary from the level of the ground upon which the truck is parked.

6. The stock rack of claim 3 in which said side walls are supported above side walls of said pick-up truck by connecting means to said front and rear walls and said stock rack and raised bed and support frame means are supported upon the bed of said truck and are adapted to be loaded thereon and removed by vertical loading upon said truck bed or horizontally from the rear of said truck bed.

7. A stock rack for pick-up trucks and the like, said rack comprising a front rack wall member, a pair of side rack walls and a rear rack wall, said rear rack wall having a left hand and right hand section spaced from one another to define a central opening receiving a gate means, a raised planiform stock supporting bed supported by support frame means upon and substantially extending over a flat bed of said truck, said support frame means being connected to the front and rear walls of said stock rack in order that the rack, support means and raised bed may be installed or removed as an integral unit, said support frame means including a pair of longitudinally extending guide members defining with said truck flat bed and said separate raised bed a storage compartment for a ramp of a stock loading chute, said ramp being slidably receivable within said compartment and having pivot means when retracted from said compartment for pivoting a forward end to said support frame means, said chute ramp having a rear end adapted to be lowered when the chute ramp is retracted by pivoting said ramp about said pivot means, and side stock restraining members removably receivable by said chute ramp in the retracted position to provide a livestock chute.

8. The stock rack of claim 7 in which said side rack walls have a rear portion supported upon a tail gate of said truck, said rear wall is supported upon a rear portion of said tail gate and said chute ramp has a pair of oppositely extending support shaft means, said support frame means having stop means at a rear portion of said tail gate for stopping said shaft means when said chute ramp is retracted, said stop means further comprising bearing means for defining said afore-mentioned pivot means.

9. The stock rack of claim 8 in which said longitudinally extending guide members receive said support shaft means in sliding relation.

10. The stock rack of claim 7 in which said stock restraining members are comprised of a rigid stock restraining wall having a plurality of downwardly extending stake elements removably receivable in socket means provided at the sides of said ramp.

11. The stock rack of claim 7 in which said raised bed is provided with a hinged extension stop means which is extensible laterally upon the flat bed of said truck in front of an inwardly extending wall portion of the truck above the truck bed and acts as a stop against said portion.

* * * * *